Feb. 6, 1951     E. HILDEBRANDT     2,540,731
NONSPILL PIEPAN
Filed May 7, 1948
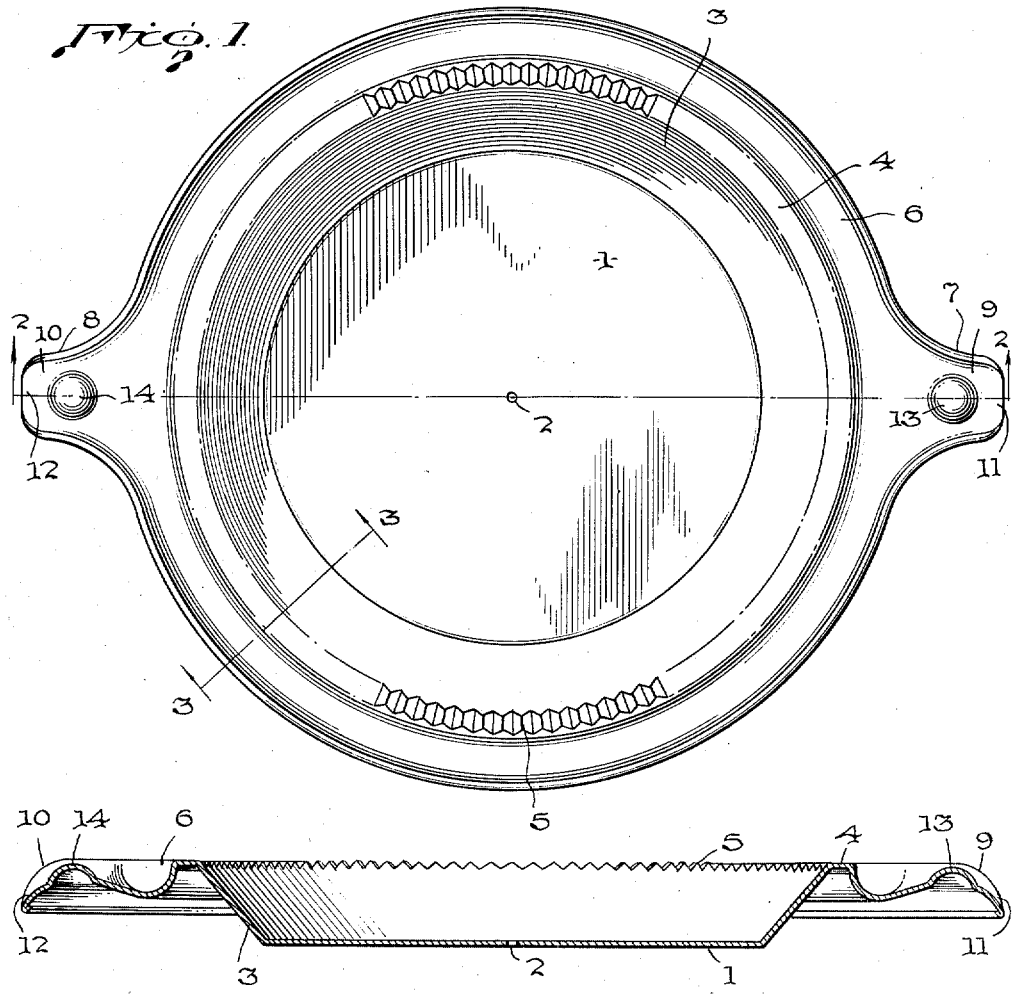
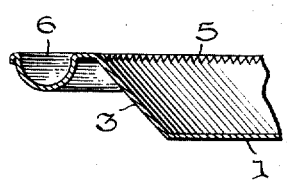
INVENTOR.
EDWARD HILDEBRANDT
BY
ATTORNEY Patented Feb. 6, 1951

2,540,731

UNITED STATES PATENT OFFICE 2,540,731

NONSPILL PIEPAN

Edward Hildebrandt, Seattle, Wash.

Application May 7, 1948, Serial No. 25,721

1 Claim. (Cl. 126—385)

This invention relates to a new and improved pie pan and more particularly to a pie pan of a type and structure making for facile and safe handling after the baking operation.

An object of the invention is to provide a pie pan which may be handled with safety after baking, resulting in a minimum of accidents caused by dropping of the pan.

Another object is to provide a pie pan in which juices are prevented from running over the edge and down the outside of the pie pan during the baking process, but which may be readily and safely removed at any time without spilling and the consequent mess incident thereto.

A further object of the invention is to provide a pie pan of the foregoing general character which is extremely simple in construction, attractive in appearance and which is cheap to manufacture, involving a simple one-step stamping operation when the pan is made of metal or a simple molding operation when the pan is made of a plastic material.

A further and very salient object of the invention is the provision of a pie pan having a pair of novel dual-purpose handles of a particular configuration serving to enable the user to obtain a firm grip on the pan after baking and at the same time providing means to drain off the juice.

With these and other objects in view, which will be apparent during the course of the following description, the invention consists of the novel features of construction, combination and arrangement of parts hereinafter fully described and claimed, and shown in the accompanying drawings, in which:

Fig. 1 is a top plan view of the pie pan;

Fig. 2 is a sectional view taken on line 2—2 of Fig. 1; and

Fig. 3 is a fragmentary sectional view taken on line 3—3 of Fig. 1.

The pie pan is made up of the conventional circular pie-receiving body portion including a bottom 1, air vent 2, and outwardly flared integral side walls 3. Extending outwardly from the circumferential edges of the flared walls is a broadened rim 4 preferably having stamped flutings 5 of any desired configuration. These flutings facilitate the formation of scalloped edges in the finished pie and obviate the necessity of forming these edges entirely by hand, which is the customary procedure. From the outer edges of the flat rim 4 depends an annular juice-receiving gutter 6. Directly communicating with the juice-receiving gutter 6 are a pair of diametrically-opposed, dual-purpose juice-pouring spouts and handles, generally designated at 7 and 8. These dual-purpose juice-pouring spouts and handles extend outwardly from and are integral with the outer rim of the juice-receiving gutter and are channeled as at 9 and 10 and flared downwardly as at 11 and 12. To provide a firmer grip, the dual-purpose spouts and handles are provided with knobs 13 and 14.

The advantages of the dual-purpose juice-pouring spouts and handles will become readily apparent. The pan is removed from the oven by gripping each handle with the thumb and forefinger of each hand, the forefinger in each instance resting under the knobs 13 and 14 and the thumb pressed against the top of the knobs. After the pie has been removed from the oven, the juices accumulating in the annular juice-receiving gutter 6 are removed by simply pouring them out of either of the channels 11 and 12.

What is claimed is:

A pie pan comprising a circular, pie-receiving body portion having integral, outwardly-flaring side walls, a broadened rim extending outwardly from the circumferential edges of said flared walls, an annular juice-receiving gutter depending from and integral with said broadened rim, and a pair of wide-channeled, diametrically-opposed, dual-purpose juice-pouring spouts and handles extending for a substantial distance outwardly from and integral with the outer rim of said gutter and in a plane substantially parallel to that of the bottom of the pan, each of said dual-purpose spouts and handles having downwardly extending lips at the extremities thereof and being provided with a knob stamped in the channel thereof at a point outwardly removed from said outer rim so that firm handling of the pan may be attained by placing the thumb in the channel and over the knob, the forefinger under the spout-handle with the tip of the forefinger resting in the cavity formed by the stamped knob and the middle finger pressing firmly against said downwardly extending lip at the extremity of the spout-handle, the channel portions of the spout-handle having substantially parallel side walls and being of sufficient width to firmly accommodate the thumb therein.

EDWARD HILDEBRANDT.

REFERENCES CITED

The following references are of record in the file of this patent:

UNITED STATES PATENTS

| Number | Name | Date |
|---|---|---|
| 247,576 | Ovens | Sept. 27, 1881 |
| 843,109 | Sabin | Feb. 5, 1907 |
| 883,296 | Cook | Mar. 31, 1908 |
| 915,802 | Smith | Mar. 23, 1909 |
| 1,097,367 | Sabin | May 19, 1914 |
| 1,612,551 | Twohey | Dec. 28, 1926 |
| 1,974,443 | Bean | Sept. 25, 1934 |
| 2,262,204 | Rideout | Nov. 11, 1941 |
| 2,346,839 | Harriss et al. | Apr. 18, 1944 |

FOREIGN PATENTS

| Number | Country | Date |
|---|---|---|
| 11,847 | Great Britain | of 1887 |